United States Patent [19]

Fickes et al.

[11] Patent Number: 4,670,978

[45] Date of Patent: Jun. 9, 1987

[54] CONNECTOR MOUNTING PRESS

[75] Inventors: Edward L. Fickes, Mechanicsburg; Jon F. Kautz, Camp Hill, both of Pa.

[73] Assignee: AMP Incorporated, Harrisburg, Pa.

[21] Appl. No.: 801,378

[22] Filed: Nov. 22, 1985

Related U.S. Application Data

[63] Continuation-in-part of Ser. No. 695,589, Jan. 28, 1985, abandoned.

[51] Int. Cl.[4] .............................................. B23P 19/04

[52] U.S. Cl. ....................................... 29/741; 29/809; 29/739; 74/527; 192/142 R; 221/279

[58] Field of Search ................. 29/741, 740, 739, 809, 29/832-839; 414/330; 221/279, 77; 74/527; 192/142 R; 269/63, 67, 68, 69, 70, 903

[56] References Cited

U.S. PATENT DOCUMENTS

| | | | |
|---|---|---|---|
| 987,634 | 3/1911 | Lovatt | 221/279 |
| 3,545,064 | 12/1970 | Zemek et al. | 29/741 |
| 3,670,387 | 6/1972 | Nagao | 29/809 |
| 4,077,557 | 3/1978 | Green | 29/741 |
| 4,242,793 | 1/1981 | Matthews et al. | 29/809 |
| 4,383,361 | 5/1983 | Kautz | 29/739 |
| 4,573,262 | 3/1986 | Dornes et al. | 29/739 |

FOREIGN PATENT DOCUMENTS

| | | | |
|---|---|---|---|
| 746776 | 2/1980 | U.S.S.R. | 29/741 |

OTHER PUBLICATIONS

Leung, T. L., Insertion Head for Multi-Size Square Modules, IBM Technical Disclosure Bulletin, vol. 25, No. 7A, Dec. 1982.

*Primary Examiner*—Percy W. Echols
*Attorney, Agent, or Firm*—Allan B. Osborne

[57] ABSTRACT

A connector mounting press for mounting connectors onto a circuit board. The press includes a connector receiving space and a device to releasably hold a connector therein to be picked up by a descending tool unit for mounting on an underlying circuit board. A device for automatically transferring connectors from a magazine to the space and for applying a constant pressure on the connectors in the magazine and space is also disclosed.

13 Claims, 20 Drawing Figures

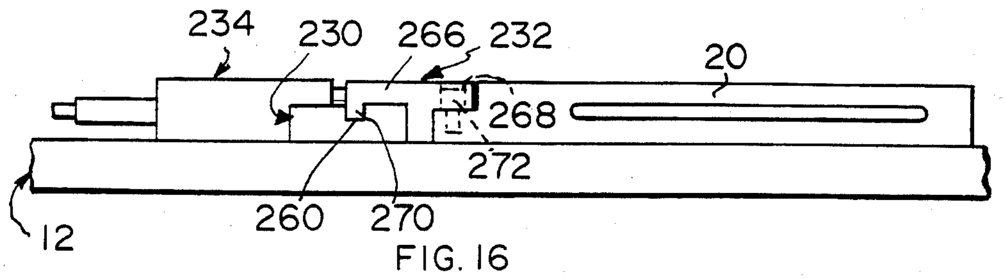
FIG. 16
FIG. 18
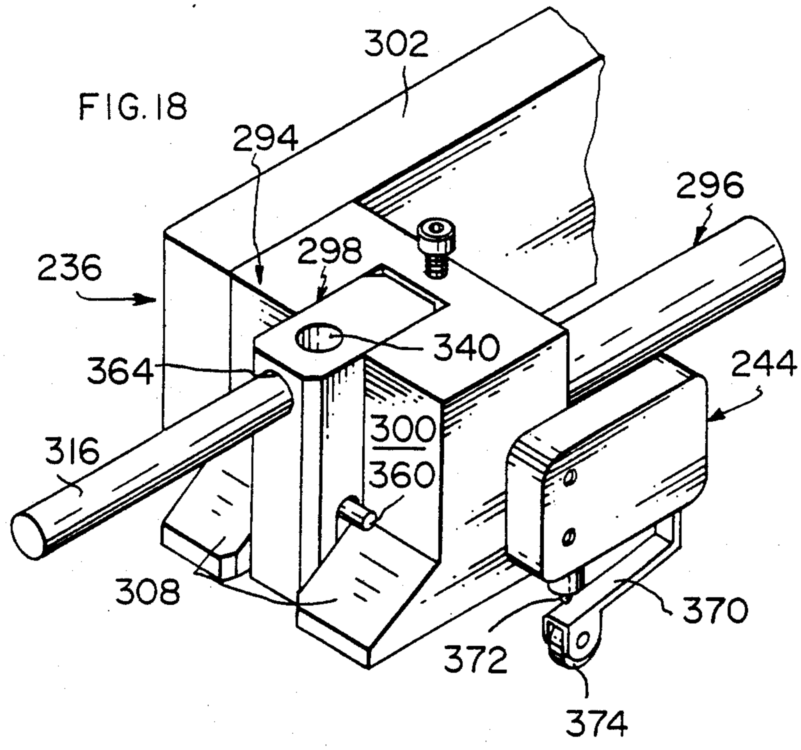

CONNECTOR MOUNTING PRESS

The present application is a continuation-in-part of Application Ser. No. 6-695,589, filed on Jan. 28, 1985 now abandoned.

FIELD OF THE INVENTION

The invention disclosed herein relates to a press for mounting card edge connectors onto a printed circuit board. More particularly, the press includes storage and transfer means for serially advancing connectors into the path of a reciprocating insertion tool which carries the leading connector to the board and presses the posts into plated-through holes therein.

BACKGROUND OF THE INVENTION

U.S. Pat. No. 4,367,583 discloses a mounting press for mounting preassembled card edge connectors onto a printed circuit board. The press includes an insertion head having two rows of push pins with alignment means between the rows. The connectors include a housing with a row of contacts on each side of a card edge receiving slot. The lower ends or posts of the contacts extend below the housing and have compliant sections thereon for being frictionally seated in plated-through holes in the circuit board.

The procedure for seating or mounting the connectors begins with manually placing each connector on the circuit board with the posts of the contacts loosely inserted into respective plated-through holes. The circuit board is then placed on an X-Y table in the press and the insertion head moved downwardly to engage a respective connector in alignment therewith. The alignment means first engage the connector to straighten it if necessary and then the push pins enter the contact cavities in the connector housing to engage upwardly facing shoulders on the contacts therein. Continued downward travel of the insertion head presses the compliant sections of the contact posts into the plated-through holes to complete the connector mounting. The insertion head is then withdrawn, the table moved to bring another loosely mounted connector into alignment with the insertion head travel path to repeat the mounting procedure.

The above described mounting procedure requires labor and time to loosely insert the depending contact leads of each connector into the plated-through holes in the circuit board. The present invention is intended to provide an improved connector mounting press in which the connectors are stored, successively transferred to releasable retaining means and from there picked up by a moving insertion tool to be carried to and mounted on a circuit board thereby.

SUMMARY OF THE INVENTION

A connector mounting press for mounting connectors onto a circuit board, according to the present invention, comprises connector mounting means having connector engaging means thereon is movably mounted on supporting means extending above circuit board support means, power means for moving the connector mounting means through a predetermined path towards and away from the support means, and releasable retaining means supported by the supporting means for releasably retaining a connector in the path until engaged by the connector engaging means as the connector mounting means moves towards the support means.

BRIEF DESCRIPTION OF THE DRAWINGS

FIG. 15-A is a perspective view of one component of the indexing means;

FIG. 16 is a frontal view of some of the components of the indexing means;

FIG. 18 is a perspective view of the drive unit assembled; and

DESCRIPTION OF THE INVENTION

Figure 1:
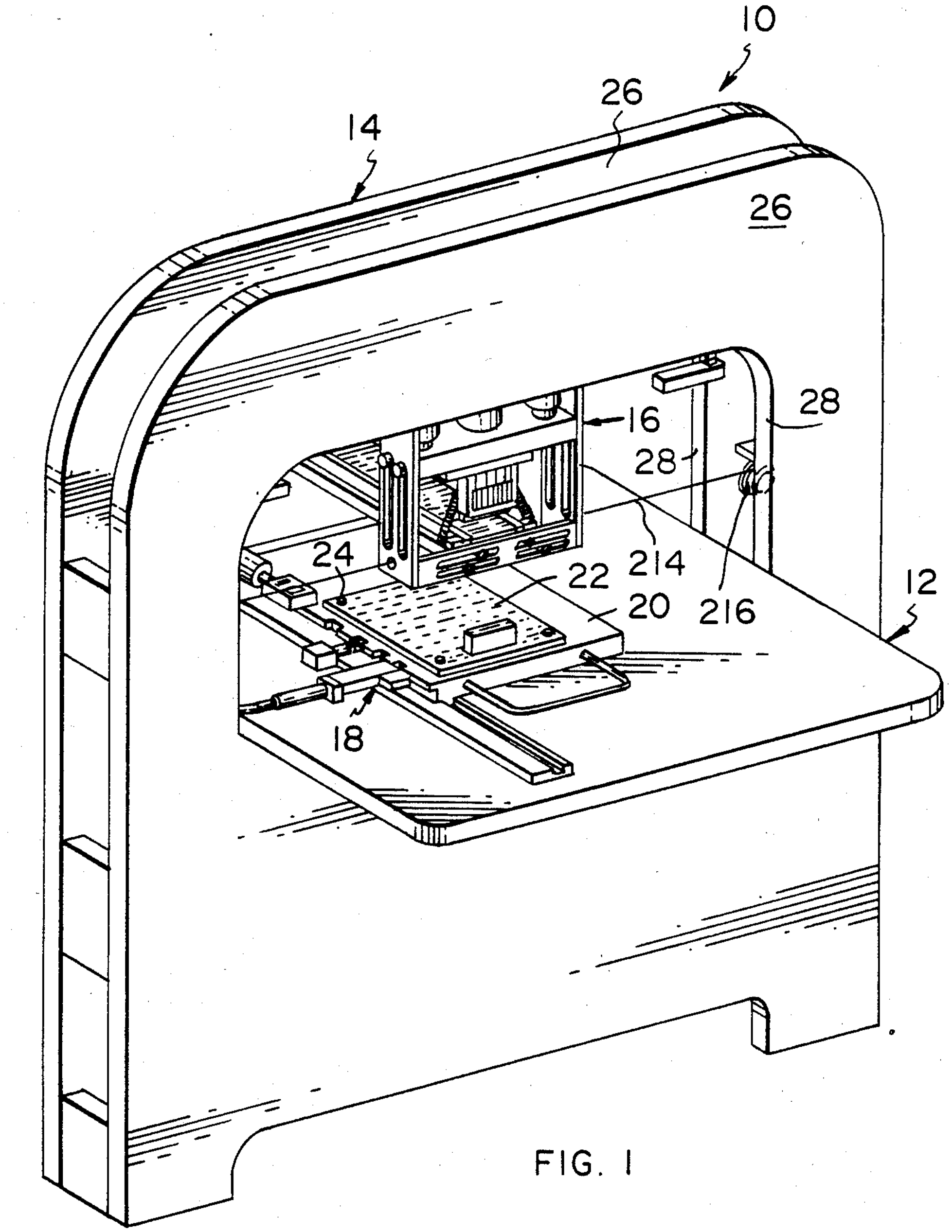
FIG. 1 is a perspective view showing a connector mounting press of the present invention.
Figure 2:
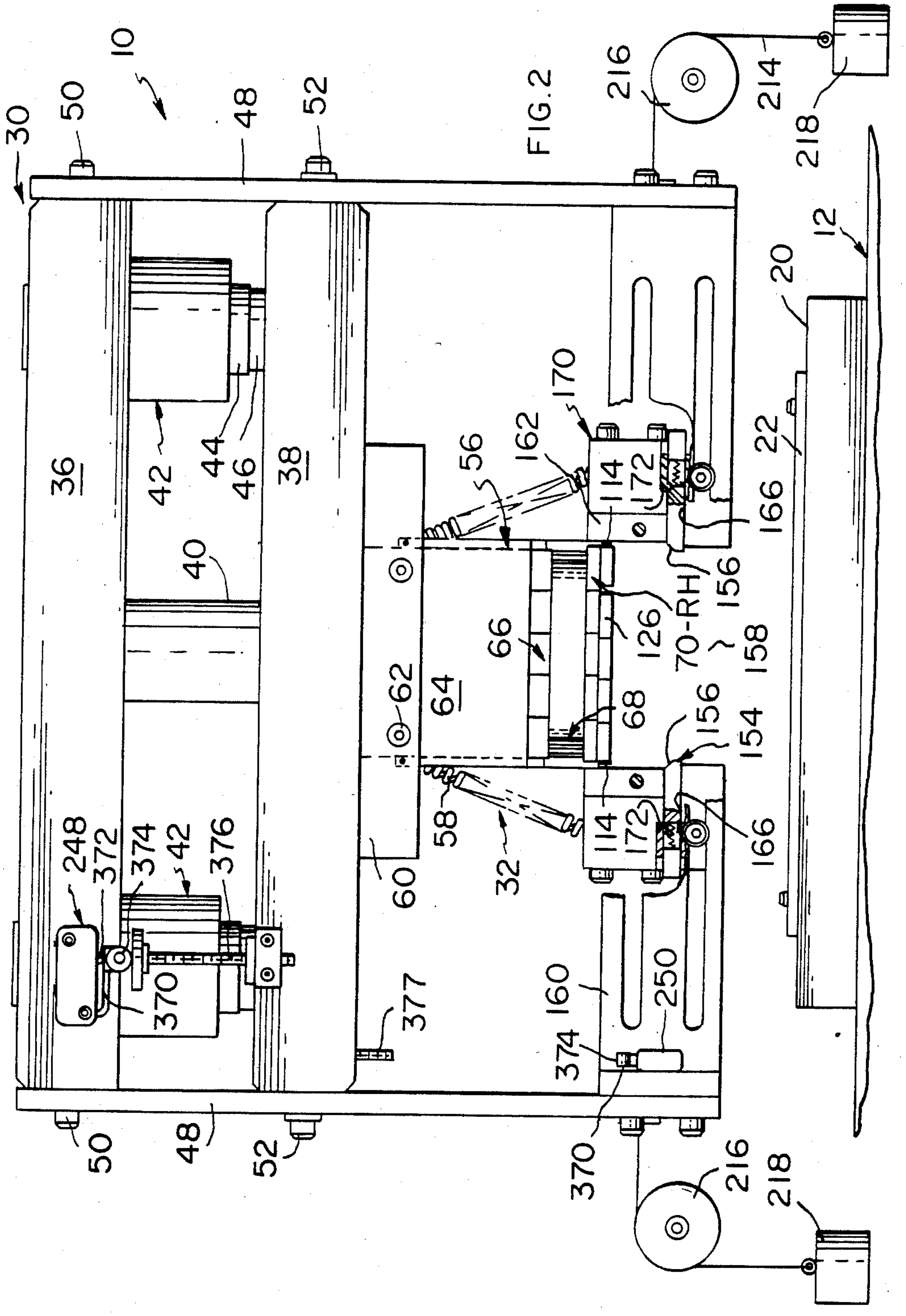
FIG. 2 is a frontal view of the connector mounting press.

As shown in FIGS. 1 and 2, connector mounting press 10 includes table 12, support frame 14 and insertion assembly 16. Indexing unit 18 and template 20 are mounted to table 12. Printed circuit board 22 is removably secured to template 20 by bolts 24.

Support frame 14 consists of two spaced apart metal plates 26, secured together and having aligned openings 28 therethrough in which table 12 is positioned. Plates 26 further support insertion assembly 16 above table 12.

Insertion assembly 16 comprises three units: power unit 30, tool unit 32, and connector handling unit 34.

As shown in FIG. 2, power unit 30 consists of fixed upper shoe 36, movable lower shoe 38, power sub-unit 40 and guide members 42. Upper shoe 36 is fixed to plates 26 and has mounted thereon power sub-unit 40 and guide members 42. A hydraulically operated, reciprocating piston (not shown) in power sub-unit 40 is attached to and moves lower shoe 38 vertically towards and away from table 12. Guide members 42 have slidingly mounted therein telescoping sleeve 44 and post 46, the free ends of the latter being attached to lower shoe 38. Guide members 42 keep lower shoe 38 from tilting as it is moved up and down.

Additional guidance is provided by a pair of side plates 48 which are attached to the ends of upper shoe 36 by bolts 50 and extend down towards table 12. Cap screws 52, attached to the ends of lower shoe 38, extend through slots 54 (FIG. 3) in side plates 48 and confine lower shoe 38 to moving vertically only.

Upper and lower shoes 36, 38 respectively and guide members 42 are commercially available from the Producto Machine Company of Bridgeport, Connecticut. Power sub-unit 40, known as an enerpac unit, is commercially available from York Machinery and Supply Company of York, Pennsylvania. A conventional pump (not shown), also from York Machinery, provides hydraulic fluid to the enerpac power sub-unit 40.

Figure 3:
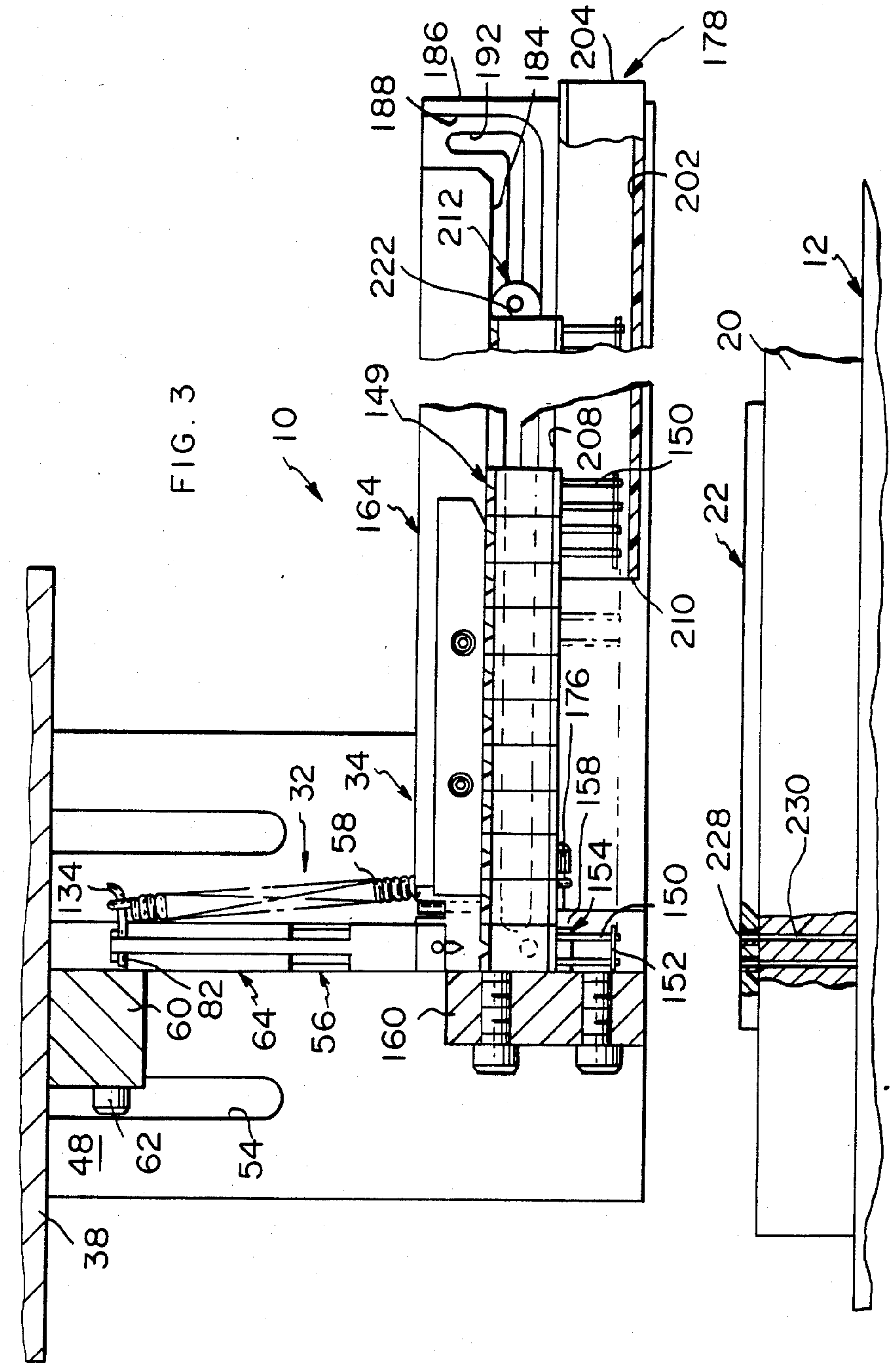
FIG. 3 is a side view of the connector mounting press.

As shown in FIGS. 2 and 3, tool unit 32 consists of insertion head 56, coil springs 58 and mounting block 60 which is attached to lower shoe 38. As shown, insertion head 56 is bolted to mounting block 60 by bolts 62.

Figure 5:
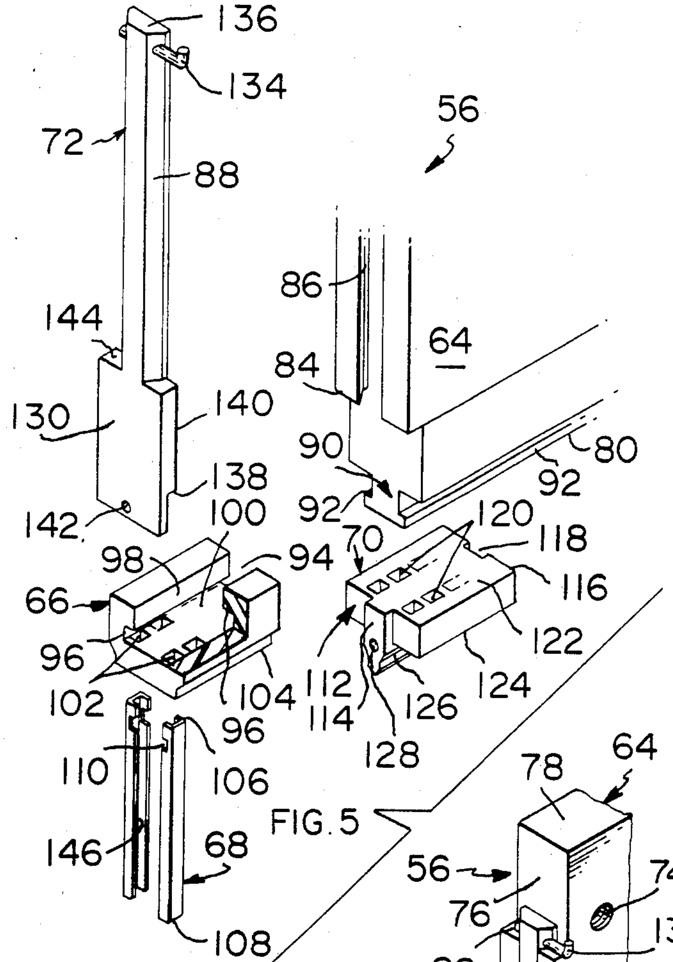
FIG. 5 is an exploded view of the insertion head of FIG. 4.
Figure 4:
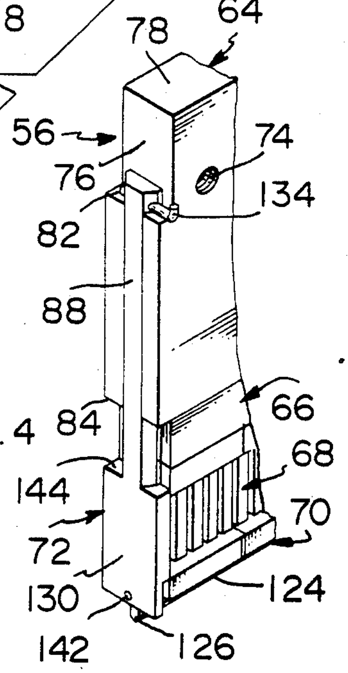
FIG. 4 is a partial view of an insertion head of the tool unit of the connector mounting press.
Figure 6:
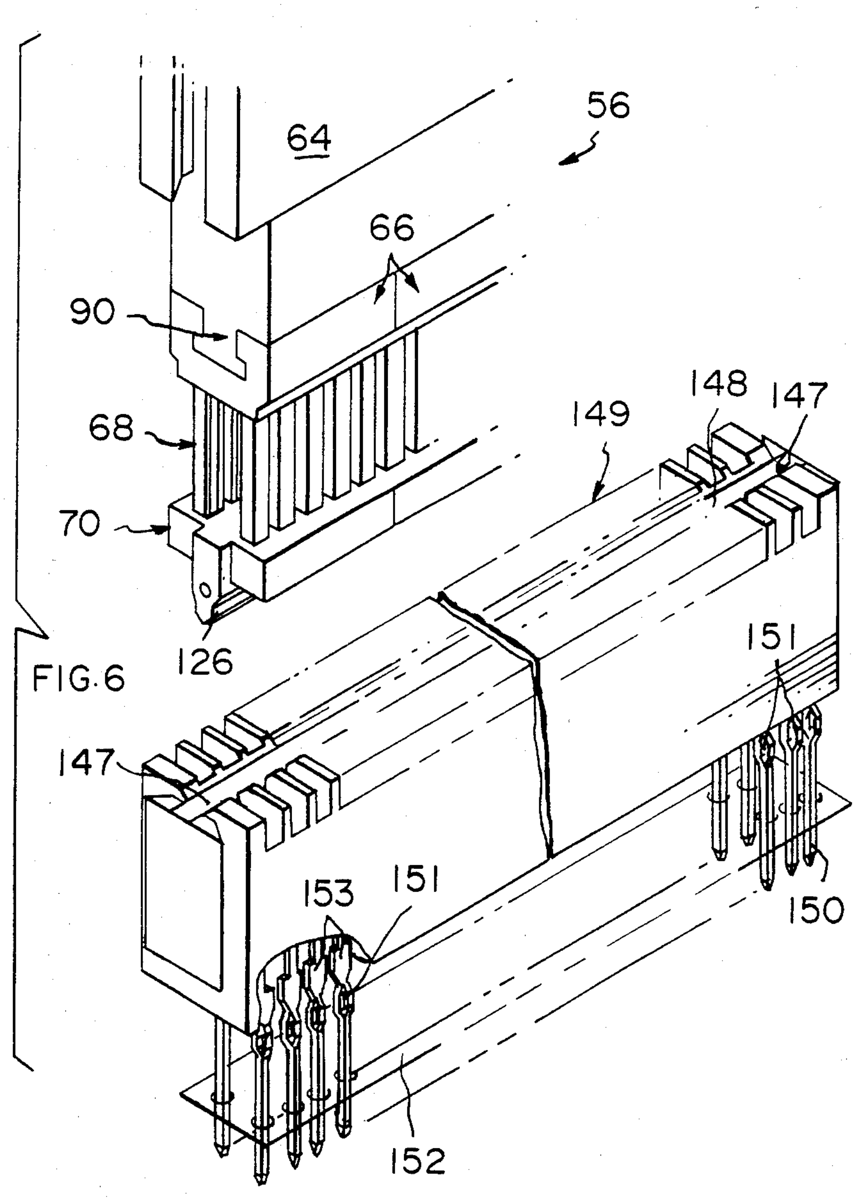
FIG. 6 is a partial, detailed view of the insertion head of FIGS. 4 and 5 and further includes a perspective view of a connector.

Insertion head 56 is shown in greater detail in FIGS. 4, 5 and 6. As seen in FIGS. 4 and 5, insertion head 56 includes rectangular plate 64, pin housings 66, push pins 68, locator blocks 70 and sliding members 72.

Plate 64 of insertion head 56 which is a block of metal such as steel, is provided with threaded holes 74 to receive the aforementioned bolts 62 associated with mounting block 60.

Each side 76 of plate 64 is stepped inwardly near top surface 78 and bottom surface 80 as shown in FIG. 4 to provide upwardly facing shoulder 82 and downwardly facing shoulder 84 respectively.

Dovetail grooves 86 are formed in sides 76 extending between and opening out on shoulders 82, 84 to slidingly receive complementary shaped upper portion 88 of sliding members 72.

As more particularly shown in FIG. 5, the lower end of plate 64 is an inverted T beam 90 with lateral flanges 92.

Pin housings 66 have inverted T-shaped channels 94 opening out upwardly and at each end. Lateral recesses 96 in side walls 98 of channels 94 are contiguous with channel floor 100. Two spaced-apart rows of rectangular apertures 102 extend through housings 66 from channel floor 100 to bottom surface 104. As shown in FIG. 5, apertures 102 open out within the confines of recesses 96.

Push pins 68 are channel-shaped, having upper end 106, distal end 108 and a notch 110 adjacent upper end 106.

Locator blocks 70 have a male end wall 112 with vertical key 114 and an opposed female end wall 116 with vertical slot 118. Rectangular apertures 120, arranged in two, spaced-apart longitudinal rows, extend vertically from top surface 122 to bottom surface 124. A central, wedge-shaped spine 126 extends longitudinally along bottom surface 124 between the two rows of apertures 120. Each block 70 has a hole 128 extending lengthwise therethrough just above spine 126.

As shown in FIG. 5, slide member 72 includes the aforementioned dovetail-shaped upper portion 88 and a rectangular lower portion 130. Pin 134, bent upwardly, is located in upper portion 88 near free end 136. Lower portion 130 has a recess 138 on inside surface 140 of member 72, a hole 142 near the bottom edge and upwardly facing shoulders 144.

Assembly of insertion head 56 will be readily understood with reference to FIG. 5. The following order of assembly is one of several different ways and is given for illustrational purposes only.

Push pins 68 are placed in apertures 102 with notches 110 being within recesses 96 of housings 66. The orientation of push pins 68 are as shown in FIG. 5; i.e., channels 146 in push pins 78 in one row opening towards the opposing row. Holding push pins 68 in position, each housing 66 is slid onto inverted T-beam 90 with flanges 92 being received into recesses 96 and notches 110 to retain both housings 66 and push pins 68 on plate 64.

Upper portions 88 of sliding members 72, with pins 134 removed, are slid into dovetails grooves 86 from below. Pins 134 are replaced to confine sliding members 72 to sides 76 and to limit vertical travel; i.e., pins 134 abutting upwardly facing shoulders 82 limit downward travel and shoulders 144 abutting downwardly facing shoulders 84 limit upward travel.

Locator blocks 70 are added by threading push pins 68 into apertures 120, sliding blocks 70 up on pins 68 until holes 128 are aligned with holes 142 and then pressing a dowel pin (not shown) through sliding members 72 and blocks 70. Distal ends 108 on push pins 68 are within apertures 120 adjacent bottom surface 124. FIG. 6 is a view showing housings 66, push pins 68 and blocks 70 assembled to plate 64. Sliding members 72 have been omitted for clarity. FIG. 4 shows sliding members 72 in place on the insertion head 56 of insertion assembly 16.

Locator blocks 70 are arranged on push pins 68 so that key 114 on the right hand block designated 70-RH in FIG. 2, faces to the right and keys 114 on blocks 70 to the left face left and are received in slots 118 in female ends 116 in the next block 70. This orientation insures that spines 126 on the left and right hand sides will bear against end walls 147 of card edge slot 148 of connector 149, shown in FIG. 6, during insertion.

Figure 14:
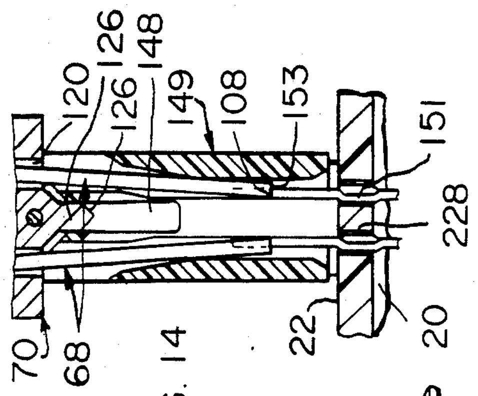
FIG. 14 is an enlarged, sectional view showing details in seating the compliant sections on the connector's depending leads.

Other features of connector 149 include depending posts 150 with compliant sections 151 thereon and a plastic strip 152 near the free ends of posts 150 to keep them in proper spatial relation with each other and with plated-through holes 228 (FIG. 3) in circuit board 22. Compliant sections 151 are disclosed in U.S. Pat. No. 4,186,982. Connector 149 has been broken away, as shown also in FIG. 14, to show upwardly facing shoulders 153 above compliant sections 151. In mounting connector 149 on board 22, distal ends 108 on push pins 68 engage and push against shoulders 153 forcing compliant sections 151 into electrical and mechanical engagement with respective plated-through holes 228 in circuit board 22 as shown in FIG. 14.

As shown in FIG. 3, coil springs 58 of tool unit 32 are attached to pins 134 at an upper end and extend down and are attached to connector handling unit 34 at the other end as will be noted below.

Connector handling unit 34 includes, generally speaking, connector retaining means, connector transfer and storage means and connector feed means. Supporting structure will be described in conjunction with the description of the aforementioned components of connector handling unit 34.

Figure 7:
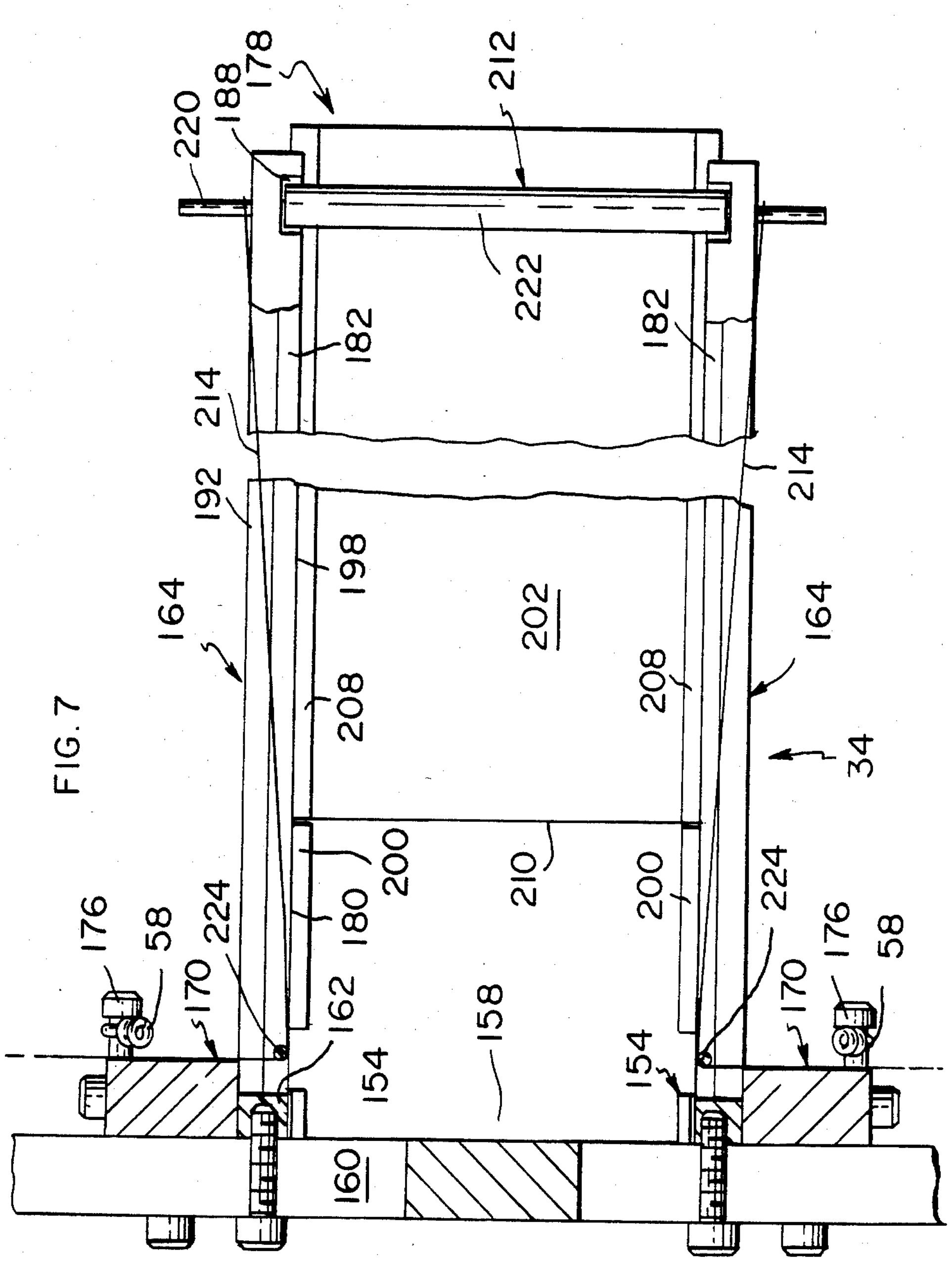
FIG. 7 is a top plan view showing generally the connector handling unit of the connector mounting press.

As shown in FIG. 2, connector retaining means include two spring loaded detents 154 with beveled cam noses 156, protruding into connector receiving space 158. Further included is the structure defining space 158; i.e., front plate 160 as seen in FIG. 7 and forward portions 162 on side walls 164 (FIGS. 7 and 9) which delineate the sides of space 158 as seen in FIG. 2. Front plate 160 has been broken away in FIGS. 2, 11, 12 and 13 for clarity.

As shown in FIG. 2, detents 154 are slidably positioned in slots 166 extending through L-shaped blocks 170 and retained therein by abutting shoulders 172, 174 on detent 154 and in slot 166 respectively.

Figure 9:
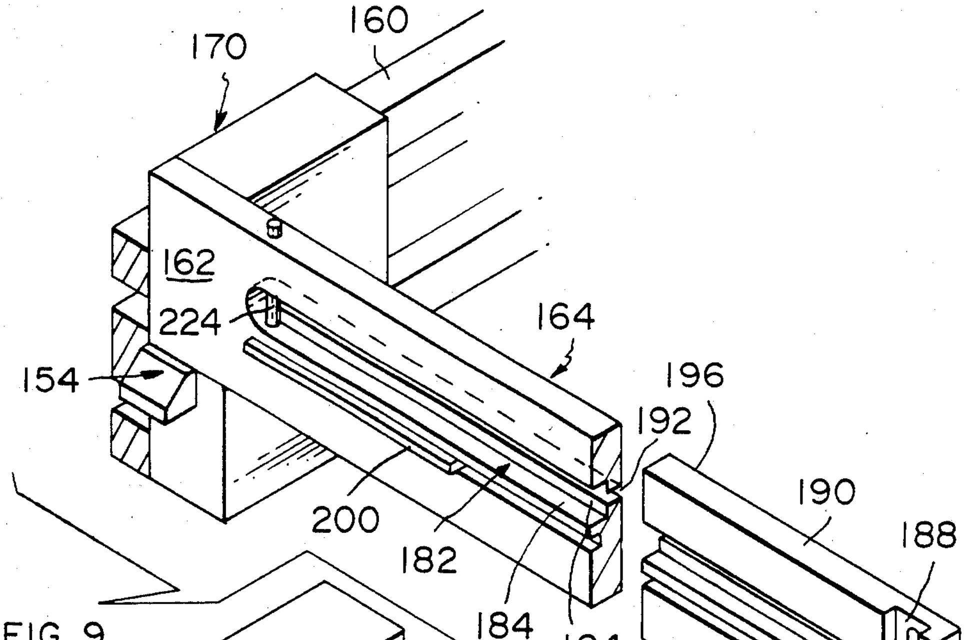
FIGS. 8 and 9 are perspective views of several of the components of the connector handling unit.
Figure 8:
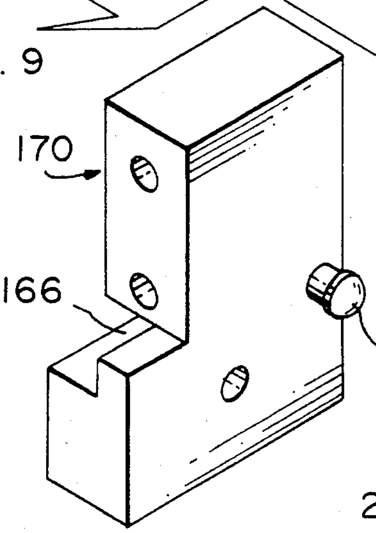

FIG. 8 is a perspective view of a block 170 and FIG. 9 shows an assembly comprising block 170, a portion of front plate 160, and one side wall 164. Both blocks 170 and side walls 164 are bolted to each other and to front plate 160 as shown in FIGS. 2 and 7. FIGS. 7 and 8 also show bolt 176 in block 170 to which the lower end of spring 58 is anchored.

Figure 11:
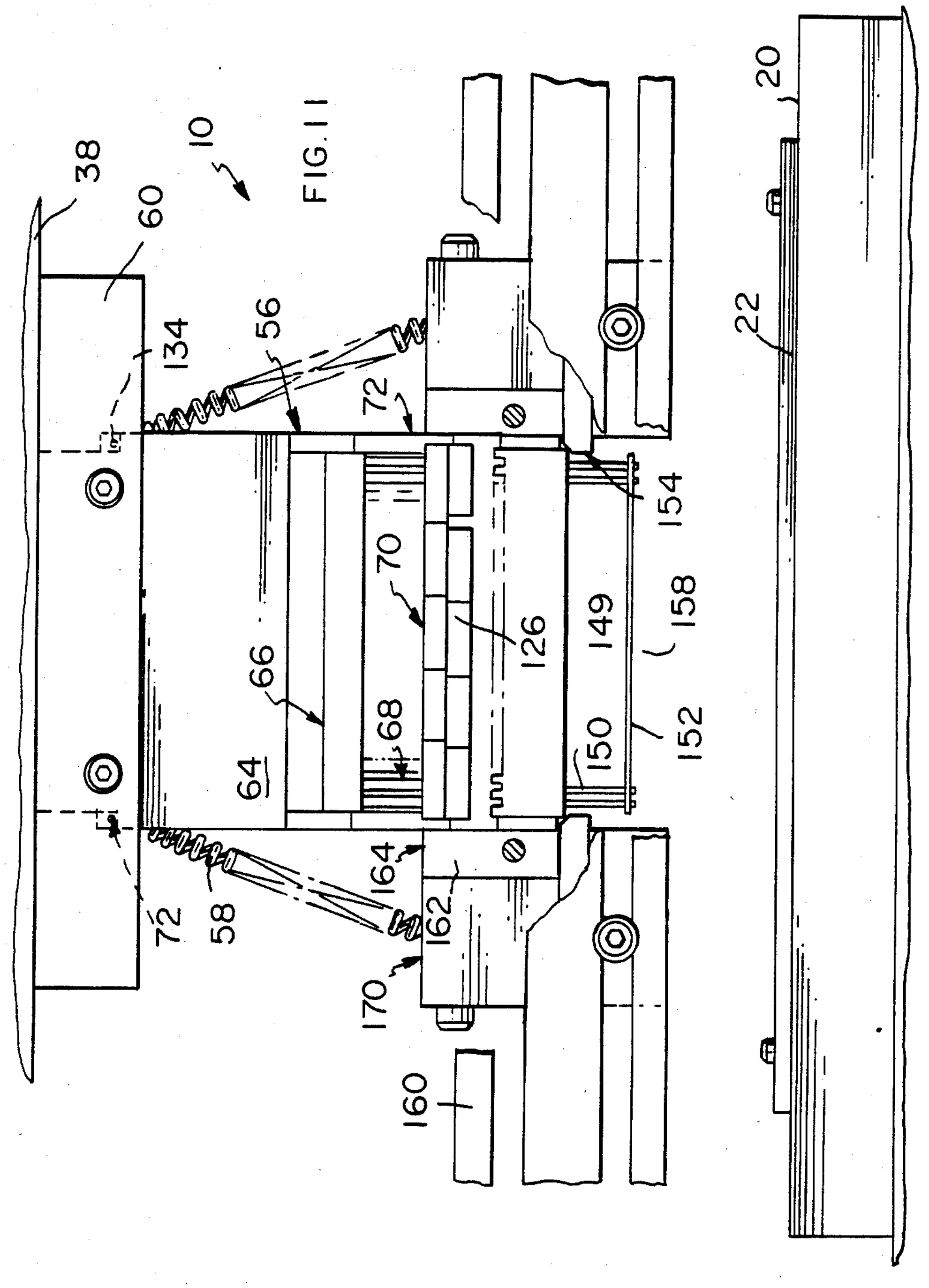
FIGS. 11, 12 and 13 are frontal views illustrating the mounting of a connector onto a circuit board.

Connector receiving space 158 is directly in the path taken by insertion head 56 as it is moved towards and away from table 12. Space 158 receives a connector 149 lengthwise as shown in FIG. 11 and is releasably retained therein in a mounting position by means of spring loaded detents 154.

As shown generally in FIG. 3 and particularly in FIG. 7, connector handling unit 34, which provides a connector transfer and storage means for press 10, include the two parallel, elongated and spaced-apart side walls 164 and removable magazine 178.

Provided in inside surface 180 of side wall 164, as shown in FIG. 9, is an L-shaped track 182 which includes an elongated, longitudinal portion 184 extending from adjacent forward portion 162 to near end 186 where a short, upturned portion 188 opens out onto top edge 190. Slot 192 in floor 194 of track 180 provides access to outside surface 196 of side wall 164. As shown in FIG. 9, slot 192 enters into short upturned portion 188 but ends below top edge 190.

A longitudinal notch 198 is also provided in inside surface 180 beneath track 182. Notch 198 extends rearwardly from forward portion 162 to and opens out at end 186. A short length insert in a portion of notch 198, provides transfer rail 200 which projects into the space between the parallel side walls 164.

Figure 10:
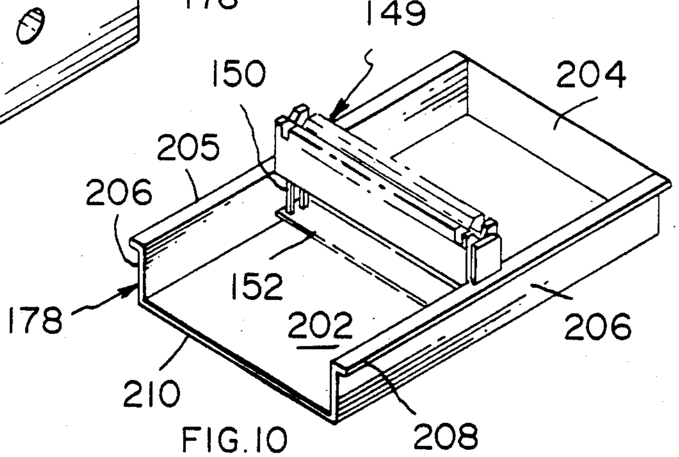
FIG. 10 is a perspective view of a magazine used in the connector handling unit.

Magazine 178 is shown in FIG. 10 with one connector 149 therein. Magazine 178 includes floor 202, rear end wall 204 and opposing side walls 206. Rails 208, projecting laterally outwardly, are provided on each side wall 206. Leading end 210 of magazine 178 is open although a temporary cover with an end wall (not shown) would be provided to confine connectors 149 within magazine 178 during storage, shipping and handling. As shown in FIG. 10, connectors 149 ride on an inner portion of rails 208 with posts 150 extending down into the space above floor 202 and between side walls 206.

With reference to FIG. 7, magazine 178 slides into the space between side walls 164 and is supported by the outer portion of rails 208 being received in notches 198. Rails 208 abutt and are on the same level with rails 200 on side walls 164 to provide a continuous connector transfer or feed path from storage in magazine 178 to connector receiving space 158.

As shown in FIG. 7, connector feed means include bar 212, two cords 214 and, as shown in FIG. 2, pulleys 216 and weights 218.

Bar 212 extends between and is slidably supported in tracks 182 in side walls 164. Handles 220, one on each end of bar 212, project out through slots 192 in side walls 164 as shown in FIG. 7. Bar 212 resembles a "D" as viewed from an end (FIG. 3) with flat face 222 facing connector receiving space 158 when positioned in side walls 164.

Each cord 214 is attached to respective handles 220 and to respective weights 218, passing around dowel pins 224 mounted in tracks 182 adjacent portions 162 (FIGS. 7 and 9) and over pulleys 216 (FIGS. 1 and 2). Pulleys 216 are supported by plates 26 (FIG. 1).

Weights 218, via cords 214, urge bar 212 and the connectors 149 on rails 200, 208 (as shown in FIG. 3) towards connector receiving space 158. The pressure exerted by weights 218 is constant regardless of the number of connectors 149 in front of bar 212.

The operation of press 10 will now be given with the description of indexing unit 18 being deferred in that it need not be used to practice the invention pertaining to press 10.

As shown in FIG. 3, circuit board 22 is secured to template 20 with plated-through holes 228 in board 22 being directly in line with holes 230 in template 20.

With reference to FIG. 7, bar 212 is pulled back along tracks 182 against the pressure of weights 218 and lodged in upturned portions 188. Magazine 178 with connectors 149 therein (FIG. 3) is positioned between side walls 164 as described above; i.e., rails 208 sliding along notches 198 and abutting rails 200. Means (not shown) may be incorporated to latch magazine 178 to side walls 164 if desired.

With reference to FIG. 3, connectors 149 in magazine 178 are pushed forward onto rails 200 and, placing the leading connector 149 into connector receiving space 158. Moving connectors 149 forward places the last connector 149 forward of upturned portions 188 so that bar 212 can then be moved down into longitudinal portions 184 of tracks 182 and against last connector 149.

Connector 149 in connector receiving space 158 is retained therein by detents 154 and also by being pressed against front plate 160 via weights 218 exerting pressure against the row of connectors 149 on rails 200, 208 through bar 212.

FIG. 11 is a view looking into the front of connector mounting press 10 with a connector 149 in connector receiving space 158 and insertion head 56 thereabove. Printed circuit board 22 is positioned on template 20 therebelow. Coil springs 58 are under tension, pulling down on sliding members 72 so that locator blocks 70 are adjacent distal ends 108 (FIG. 5) of push pins 68.

Figure 12:
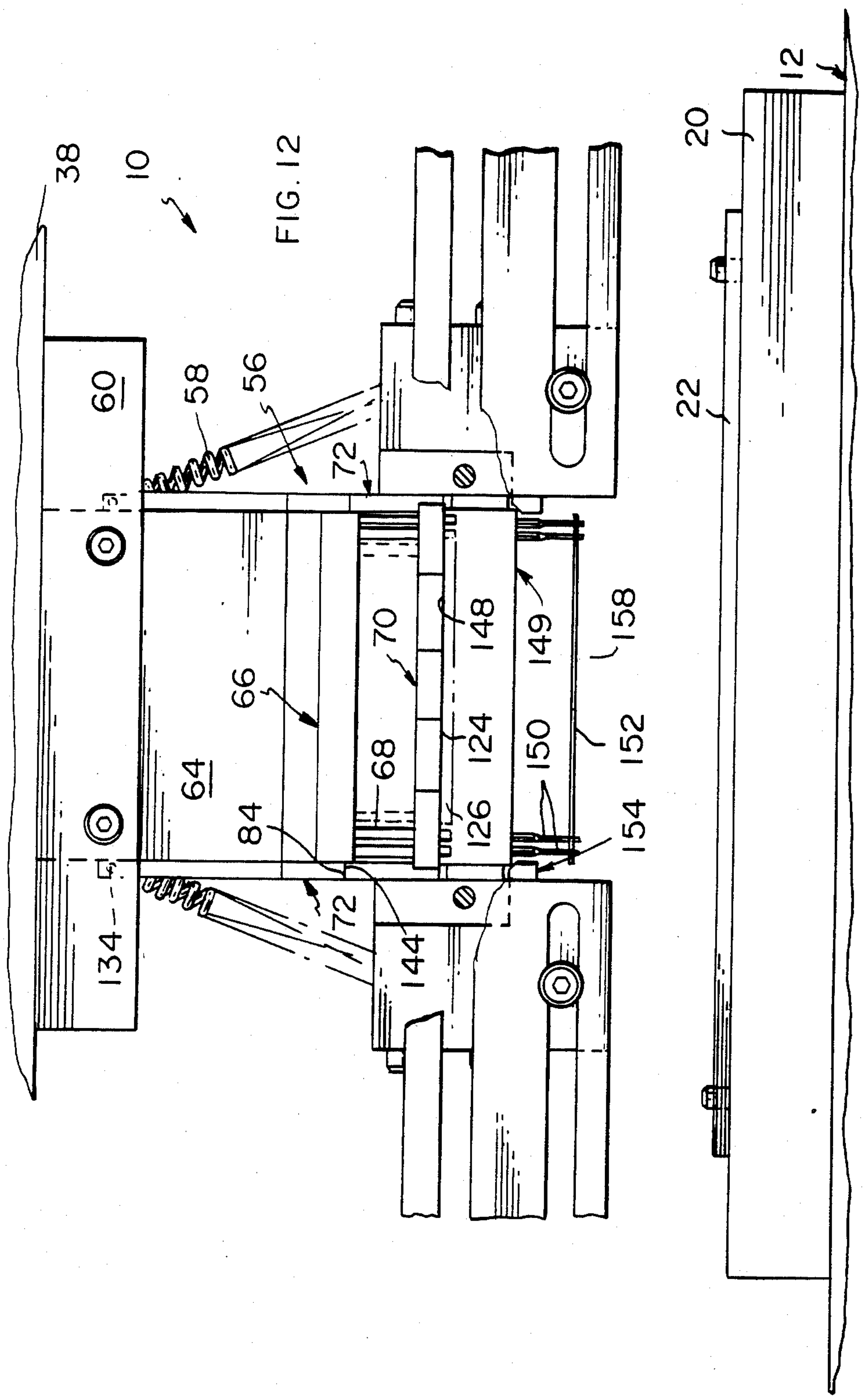

FIG. 12 shows insertion head 56 descended to where bottom surfaces 124 on blocks 70 have reached the top of connector 149 and spines 126 have entered card edge slot 148 in a slight interference fit to align connector 149 with descending push pins 68. At this point, blocks 70 and connected sliding members 72 stop moving; i.e., they do not exert enough force on connector 149 to cause detents 154 to be pushed back into slots 166 in blocks 170.

As insertion head 56 descends further, upwardly facing shoulders 144 on sliding members 72 abutt downwardly facing shoulders 84 on plate 64 so that members 72 and blocks 70 must thereafter move downwardly. Accordingly, coil springs 58 will begin to lose tension as mounting pins 134 approach non-moving bolts 176 (FIGS. 3, 8 and 13).

Simultaneously, distal ends 108 on push pins 68 will have landed on upwardly facing shoulders 153 of respective electrical contacts in connector 149 as shown in FIG. 14 and the descending insertion head 56 will force back detents 154 to release connector 149 therefrom.

Figure 13:
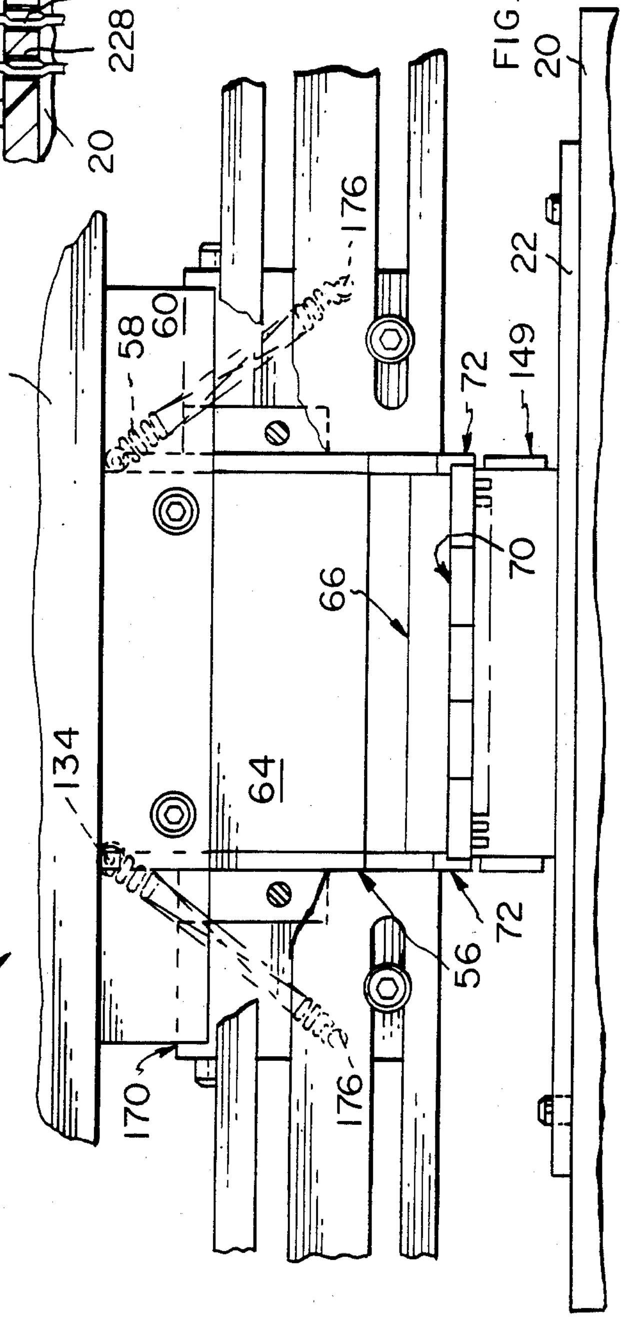

FIG. 13 shows insertion head 56 at its furthest descent and with connector 149 mounted on circuit board 22. Coil springs 58 are relaxed and locator blocks 70 are up against housings 66. Plate 64 of insertion head 56 occupies connector-receiving space 158, blocking the connector feed means from moving another connector 149 thereinto.

FIG. 14 is an enlarged view of connector 149 showing a spine 126 in slot 148, distal ends 108 of push pins 68 on upwardly facing shoulders 153 and compliant sections 151 pressed into plated-through holes 228 in board 22.

Subsequent to mounting connector 149 onto board 22, insertion head 56 ascends to its starting position as shown in FIG. 2. As insertion head 56 rises, coil springs 58 distend and in so doing, hold down on sliding members 72 and connected locator blocks 70 until distal ends 108 on push pins 68 are within locator block apertures 120. At that point, pins 134 meet upwardly facing shoulders 82, as shown in FIGS. 3 and 4, and sliding members 72, blocks 70 move upwardly thereafter to the starting position with the other components of insertion head 56.

As soon as insertion head 56 clears connector receiving space 158, the next connector 149 is moved thereinto under pressure from weights 218 as described above.

Figure 15:
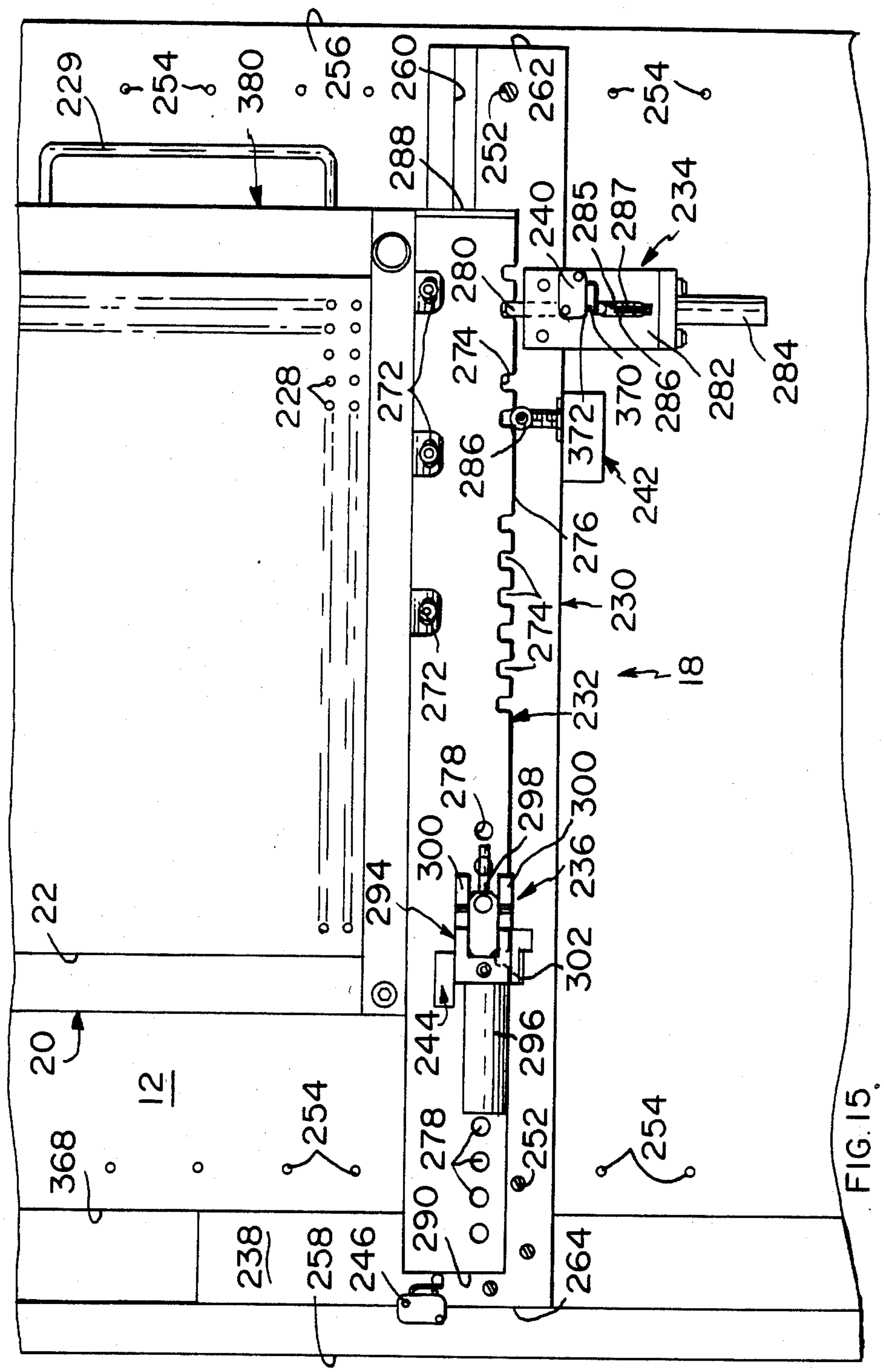
FIG. 15 is a top plan view showing the components of an indexing means incorporated in the connector mounting press.
Figure 15A:
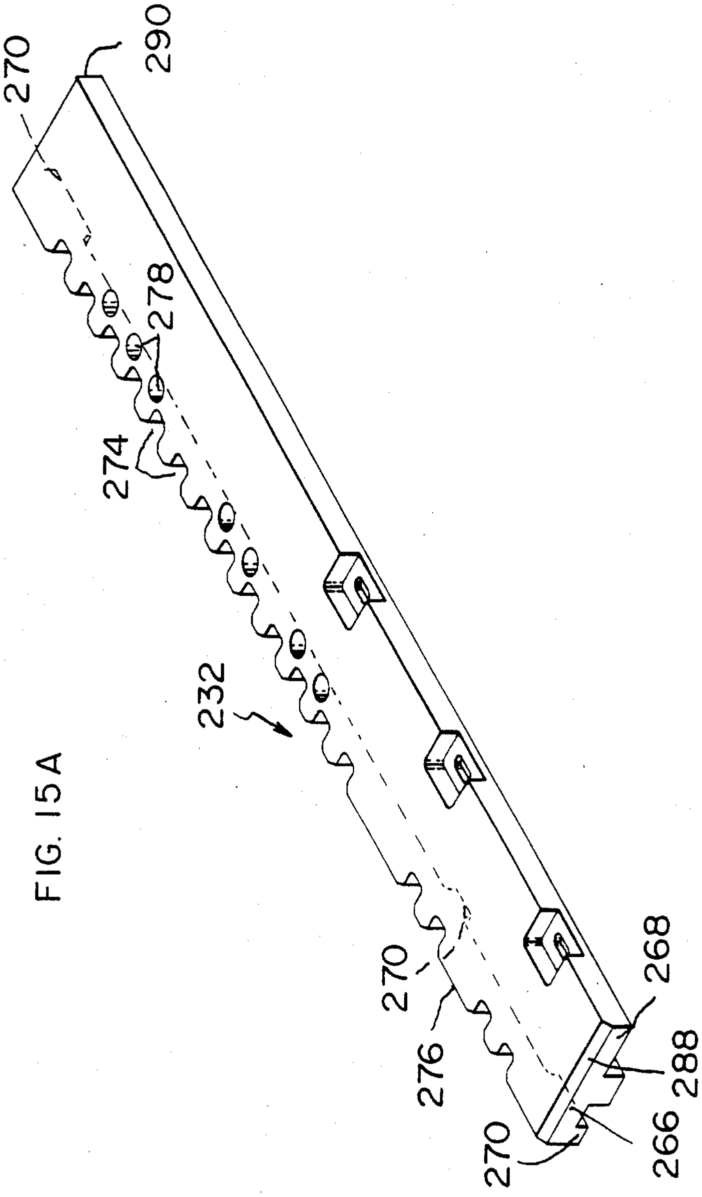

In the absence of indexing means 18, an operator presses two buttons (not shown), one on each side of table 12 to actuate tool unit 32. After a connector 149 is mounted on board 22, the operator manually moves template 20/circuit board 22 by handle 229 on template 20 (FIG. 15) to bring the next mounting site beneath connector receiving space 158 before pressing the buttons again. Equipment which would be available to keep template 20 in proper alignment includes some of the components comprising the indexing means to be described next; i.e., guide bar 230, indexing rack 232 and slide bar 238, all of which are shown in FIG. 15. Additionally, a pivotally mounted, hand operated locking device (not shown) would be used to removably lock rack 232 in place while a connector 149 is being mounted onto circuit board 22. Indexing means 18 provides a limited automatic sequential mounting capability.

Indexing means 18 includes both mechanical components and electrical switches, coils and relays. With reference to FIG. 15 the mechanical components include guide bar 230, indexing rack 232, lock unit 234, indexing drive unit 236 and slide bar 238. The mechanically operated switches shown in FIG. 15 include lock unit switch 240, motion sensing switch 242, off-switch 244 and on-switch 246. Other mechanically operated switches are switches 248 and 250 mounted on fixed shoe 36 and front plate 160 respectively, both shown in FIG. 2. The electrically driven coils and relays are shown schematically and are discussed with reference to FIG. 19.

Guide bar 230 is an elongated, metal bar removably fastened by bolts 252 being received in threaded holes 254 in table 12. As shown in FIG. 15 a series of holes 254 extend along the front and rear edges 256 and 258 respectively of table 12 to enable guide bar 230 to be laterally shifted with respect to tool unit 32 positioned thereabove.

Groove 260 is provided in guide bar 230 and extends longitudinally from front end 262 to rear end 264.

Indexing rack 232 is an elongated bar of lesser length relative to guide bar 230. As shown in FIGS. 15-A and 16, the latter being a transverse view, rack 232 slides along table 12 adjacent guide bar 230 and includes side portion 266 which overlaps guide bar 230 and side portion 268 which overlaps template 20. Several longitudinally spaced fingers 270 (only one of which is shown in FIG. 16) depend from portion 266 and are slidably received in groove 260 in guide bar 230. Rack 232 is removably secured to template 20 by bolts 272 extending through overlapping side portion 268.

With reference again to FIGS. 15 and 15-A, a plurality of notches 274 are cut into side 276 of rack 232 in a pattern determined by the connector 149 mounting sites on a given circuit board 22. Notches 274 begin adjacent front end 288 of rack 232. A row of a like plurality of drive holes 278 extend through rack 232 and are in the same pattern and spacing as notches 274 but are displaced rearwardly, placing the last drive hole 278 adjacent rear end 290 of rack 232. As noted above, notches 274 and drive holes 278 are provided in a given rack 232 to reflect the arrangement connectors 149 are to be mounted in a given row on board 22. For example, the use of rack 232 shown in FIGS. 15 and 15-A will cause connectors 149 to be mounted in two sets of two connectors 149 each with a space between the sets, then a larger space followed by a set of six connectors 149. As will be described below, the mounting sequence starts from the front of board 22 and continues to the rear thereof. After each row of connectors 149 has been mounted on board 22, board 22 is laterally shifted to position a new row of mounting sites in alignment with the mounting path of insertion head 56.

Lock unit 234 includes pin 280 extending outwardly from one end of housing 282 and an air operated double acting cylinder 284 attached to the opposite end with piston rod 286 connecting the two together. Switch actuating arm 287, secured to and movable with piston rod 286, extends upwardly through opening 285 in housing 282 to engage contact member 370 on switch 240 mounted thereon. Air cylinder 284 is commercially available from the Bimba Company. Not shown are the electrical wire receiving terminals or binding posts of switch 240 or any of the other switches.

Lock unit 234 is bolted or otherwise mounted on guide bar 230 near front end 262 such that pin 280 can be driven into notches 274 on rack 232 as rack 232 is driven along guide bar 230.

Motion sensing switch 242 is mounted on guide bar 230 and includes a moving contact (not shown) connected to spring loaded, insulative roller 286 which is sized to ride partially into and out of notches 274. Electrical engagement is made with the fixed contact (not shown) as roller 286 is being cammed out of a notch 274.

Figure 17:
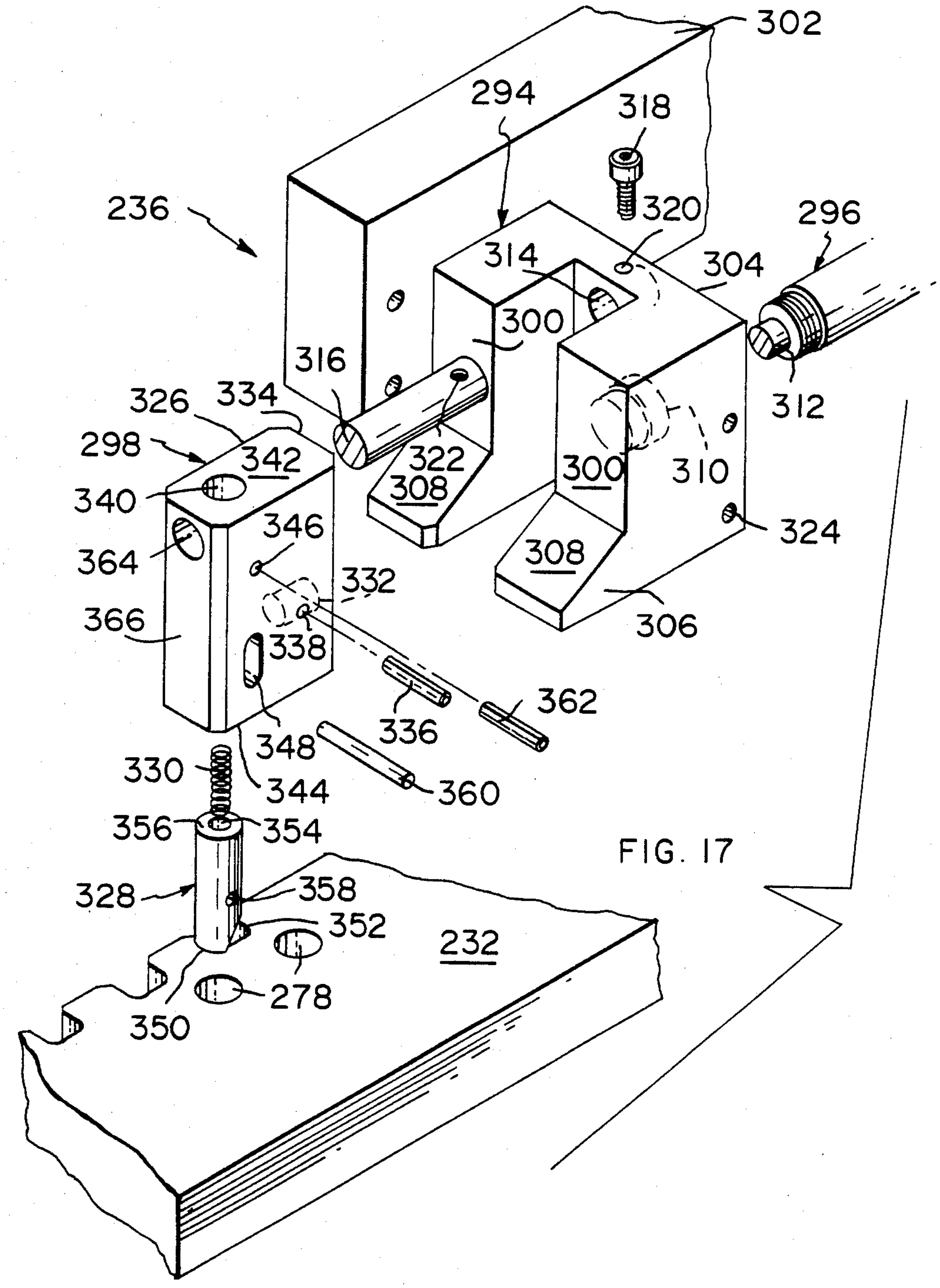
FIG. 17 is a perspective, exploded view of the drive unit of the indexing means.

Indexing drive unit 236, as shown in FIGS. 15, 17 and 18, includes a U-shaped member 294, a Bimba Company double acting air cylinder 296 attached to one end of member 294 and cam follower 298 slidably mounted between spaced apart side walls 300 of member 294 and reciprocally driven by cylinder 296.

Drive unit 236 is mounted above guide bar 230 by means of plate 302 to permit rack 232 to slide in between unit 236 and guide bar 230. Plate 302 is secured to guide bar 230 by conventional means.

U-shaped member 294 and cam follower 298 are shown in detail in FIG. 17 to which reference will not be made.

U-shaped member 294 includes the aforementioned side walls 300 joined together by back wall 304. Each side wall 300 includes at the lower front surface, a projection 306 having an upwardly facing beveled surface or ramp 308. Counterbored opening 310 in back wall 304 threadedly receives cylinder 296 and provides access into the space between side walls 300 for piston rod 312 of cylinder 296. A second opening 314 through back wall 304 receives shaft 316 which extends forwardly between side walls 300. Shaft 316 is retained in member 294 by bolt 318 positioned in hole 320 in back wall 304 which intersects opening 314 and is received into threaded hole 322 in shaft 316. Threaded holes 324 in the near side wall 300 receive bolts (not shown) which attaches switch 244 to drive unit 236. Similar holes (not shown) in the opposite side wall 300 receive bolts (not shown) securing drive unit 236 to plate 302.

Cam follower 298 includes a rectangular block 326, cam 328, coil spring 330 and several dowel pins which are described below.

Aperture 332 is provided in back surface 334 of block 326 to receive piston rod 312. Rod 312 is retained in aperture 332 by dowel pin 336 positioned in intersecting, transverse hole 338 and in an arcuate groove (not shown) in rod 312.

Cam receiving passage 340 extends through block 326, from top surface 342 to bottom surface 344. Passage 340 is intersected by hole 346 and elongated slot 348, both of which extend through block 326 from side to side.

Cam 328 is cylindrical with a lower end 350 having a rearwardly facing (when mounted in passage 340) beveled surface 352, a cavity 354 in upper end 356 and a hole 358 intermediate ends 350, 356.

Cam 328 is sized so as to be received into drive holes 278 in rack 232.

Cam 328 is held in passage 340 by an elongated dowel pin 360 passing through hole 358 in cam 328 and slot 348 in block 326 and accordingly can move for a limited vertical distance. Coil spring 330 biases cam 328 downwardly, being positioned in passage 340 between dowel pin 362 positioned in transverse hole 346 which, as shown in FIG. 17, is located above slot 348, and in cavity 354 in cam 328.

Further provided in block 326, is shaft receiving passage 364 which extends from front surface 366 to back surface 334.

FIG. 18 shows drive unit 236 assembled. Cam follower 298, with cam 328 in passage 340, is slidably mounted on shaft 316 which is received in shaft receiving passage 364. Piston rod 312 is attached to cam follower 298 as described above to move cam follower 298 back and forth on shaft 316. The ends of dowel pin 360 ride on ramps 308 as cam follower 298 is reciprocated and accordingly, cam 328 is moved up and down in passage 340.

As shown in FIG. 15, slide bar 238, a short, rectangular block of metal, is slidably positioned in groove 368 in table 12. Groove 368 extends across table 12 parallel to and near rear edge 258. Guide bar 230 is bolted or otherwise fastened to slide bar 238 so that the two must move as a unit when guide bar 230 is moved laterally. This maintains the precise relation between guide bar 230 (and the components mounted thereon; i.e., rack 232, lock unit 234, drive unit 236, motion sensing switch 242 as well as template 20 which is held alongside thereof by rack 232) and the other components of press 10, particularly insertion tool 32 and the path traveled by insertion head 56.

Switch 244, mounted on drive unit 236, is shown in FIG. 18 and includes a spring-biased actuating member 370 and a fixed contact actuating member 372. Engagement therebetween is provided by rack 232 camming member 370 against member 372 and thereby operating switch 244. Insulative roller 374 on member 370 provides an interface between rack 232 and member 370.

Switch 246 is mounted on guide bar 230 adjacent end 264. Although not shown, switch 246 includes members 370, 372 and roller 374 as shown on switch 244 and operates identically thereto. Rack 232 also actuates switch 246.

As shown in FIG. 2, switch 248 is mounted on fixed shoe 36 and also includes members 370, 372 and roller 374. Moving shoe 38, through rod 376 mounted thereon, actuates switch 248.

Switch 250, as shown in FIG. 2, is mounted on front plate 160 and also includes members 370, 372 and roller 374. Rod 377 on shoe 38 actuates switch 250.

Figure 19:
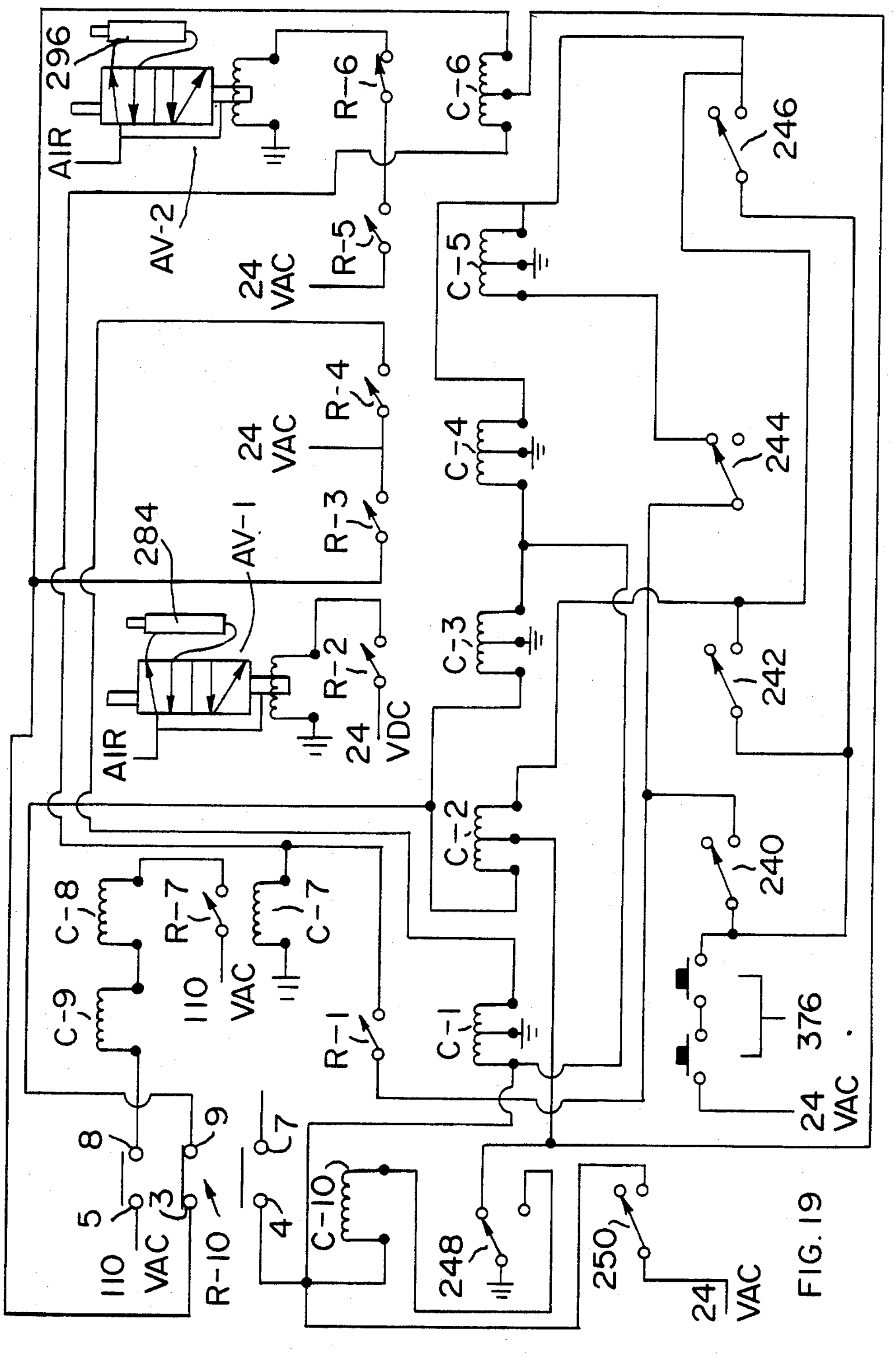
FIG. 19 is a schematic of the electrical connections between the several switches associated with the indexing means and connector mounting press.

The automatic sequential mounting procedure is set out twice below, first with emphasis on the mechanical aspects as shown in FIGS. 15 and 17 and secondly with emphasis on the switching aspects as shown in FIG. 19.

This procedure permits the automatic mounting of a row of connectors 149 on board 22.

After loading press 10 with connectors 149 as described above, the press operator secures circuit board 22 onto template 20 which is bolted to rack 232 to form rack assembly 380 (FIG. 15). Pushing rack assembly 380 rearwardly along guide bar 230, rack 232 under drive unit 236, mechanically opens switch 244 and at the end of guide bar 230, mechanically closes switch 246. Actuating switches 244 and 246 allows current to flow into the press circuitry when start buttons 376 (FIG. 19) are depressed.

Before buttons 376 are depressed, locking pin 280 is in housing 282 of locking unit 234. Cam follower 298 is against back wall 304 (FIG. 17) of U-shaped member 294, placing cam 328 up in passage 340 (and out of the way of rack 232 therebeneath) by reason of dowel pin 360 being at the high end of ramps 308.

When the operator depresses and holds buttons 376 in, locking pin 280 is driven forward by air cylinder 284 against edge 276 of rack 232. At the same time cam follower 298 is driven forward by air cylinder 296. Cam 328, under the force of coil spring 330 and with dowel pin 360 riding down ramps 308, moves down onto the surface of rack 232. As cam follower 298 moves forward cam 328 drops into the first available hole 278 and rack assembly 380 moves forward also but only until locking pin 280 enters the first available notch 274. As pin 280 moves in, switch 240 is tripped which reverses the forward movement of cam follower 298; i.e., it backs up, pulling cam 328 up, to back wall 304. With rack assembly 380 locked in place, insertion head 56 descends to mount a connector 149 onto board 22. Switch 248, on fixed shoe 36, is opened which renders inoperative both locking unit 234 and drive unit 236. As insertion head 56 mounts connector 149, switch 250 on front plate 160 is closed and insertion head 56 retracts back up to the start position, closing switch 248 in doing so, so that locking unit 234 and drive unit 236 become operable again. Locking pin 280 is withdrawn from notch 274 and cam follower 298; i.e., drive unit 236, begins to move rack assembly 380 forward. This forward movement is sensed by switch 242 which tells locking unit 234 to drive locking pin 280 forward to ride against rack edge 276 so that it can enter the next available notch 274. Upon that happening, switch 240 causes cam follower 298 to reverse its direction as noted above and insertion head 56 descends to mount the next connector 149 in the next mounting site on board 22.

The above procedure continues until rack 232 moves out from under drive unit 236 and more particularly from under switch 244 mounted thereon. Switch 244 is tripped which prevents drive unit 236 from further indexing rack assembly 380. The press operator laterally shifts indexing means 18 as required and repeats the above events to mount another row of connectors 149 onto board 22.

FIG. 19 is a circuit diagram showing the several coil driven relays and mechanical switches utilized in the automatic mounting procedure. Switches 240 through 250 and 376 are mechanically actuated as noted above. Coils C-1 through C-6 are latching coils. Coils C-7 through C-10 are holding coils. Air valves AV-1 and AV-2 are coil driven mechanical valves directing compressed air into double acting air cylinders 284 (on locking unit 234) and 296 (on drive unit 236). Similar air valves associated with coils C-8 and C-9 are not shown. Also not shown are emergency switches normally found on presses and other power drive equipment. The "on" position of the latching coils C-1 through C-6 is on the right side and the "off" position is on the left side.

The positioning of the switches and relays as shown in FIG. 19 is prior to moving rack assembly 380 rearwardly.

The sequential switching events in the automatic mounting procedure are as follows:

(1) Rack assembly moved rearwardly closing switch 246 and opening switch 244.

(2) Buttons 376 closed, turning C-2, C-4 and C-5 on.

(3) AV-2 is activated through C-5, C-6 (already on) and R-5, R-6. As soon as drive unit 236 moves rack assembly 380 forward, switch 246 reverts to an open state.

(4) C-4 turns C-1 on.

(5) C-2 activates AV-1.

(6) Switch 240 is mechanically closed, sending current through R-1 (C-1 is on) to energize C-7. Current goes through R-7 to energize C-8 to power insertion head 56 downwardly to mount connector 149 onto board 22.

(7) Switch 248 is mechanically opened, keeping C-2, C-6 from operating and providing a ground for C-10, R-10.

(8) When connector 149 is fully seated, switch 250 closes, energizing C-10 and turning C-1, C-4 off and C-3 on.

(9) Turning C-4 off stops current to the "on" side of C-1.

(10) Turning C-1 off shuts off C-7, R-7 and C-8, thus stopping any further downward movement of insertion head 56.

(11) C-3 is turned on to turn C-6 on prior to closure of switch 248.

(12) Contacts 4, 7 of R-10 hold C-10 in an energized state. Contacts 3, 9 of R-10 are opened to prevent current to pass through from C-3, R-3. Contacts 5, 8 of R-10 are closed, permitting current to energize C-9 to return insertion head 56 to its start position.

(13) Switch 248 is mechanically closed, breaking the ground path and accordingly de-energizing R-10. Ground is returned to C-2 and C-6, turning C-6 on.

(14) C-2 and C-3 are turned off by current through contacts 3, 9 of R-10.

(15) C-2, now being off, shuts current off to AV-1, thus causing locking pin 280 to be pulled back from rack 232.

(16) C-3 now being off, removes current from the off side of C-2 and C-3.

(17) C-6 energizes AV-2 which sends air into cylinder 296 to drive rack assembly 380 forward to the next connector seating position.

(18) Movement of rack assembly 380 mechanically closes switch 242 which sends current to C-2 which in turn energizes AV-1 through R-2 and also turns C-4 on which then turns C-1 on.

(19) Energized AV-1 sends locking pin 280 forward to move into the next available notch 274 on advancing rack 232.

(20) As locking pin 280 bottoms in the next available notch 274, switch 240 is closed, sending current through R-1 (C-1 is on) to energize C-7. R-7 closes, sending current to C-8 which again starts insertion head 56 to move downwardly to mount the next connector 149.

(21) Steps 6 through 19 are repeated until the last connector 149 is to be inserted.

(22) When drive unit 236 beings what will be its last forward motion to position rack assembly 380, roller 374 (FIG. 18) drops off end 290 of rack 232, closing switch 244 and sending current from switch 240 to the off side of C-5 to prevent further indexing by drive unit 236. Since switch 246 is in an open position, C-5 cannot be turned on until rack assembly 380 is moved to the rear again; i.e., until step 1 takes place.

Press 10 can be adapted whereby a computer drive X-Y table could be readily incorporated to eliminate the need for manual lateral shifting of board 22. Thus, in conjunction with indexing unit 18, board 22 could be loaded with connectors 149 automatically with assistance required only in the initial preparation steps and in keeping the connector transfer and storage unit filled with connectors 149.

As can be discerned, a novel machine has been disclosed for pressing compliant sections of electrical contacts of electrical connectors into plated-through holes of a circuit board whereby the connectors are automatically fed into a connector receiving space and retained thereat until picked up by pressing means which carry the connector to the circuit board and press the compliant sections into the plated-through holes by means on the pressing means engaging shoulders on the electrical contacts to thereby mechanically and electrically mount the connector onto the circuit board.

We claim:

1. A connector mounting press for mounting connectors onto a circuit board, comprising:

connector mounting means having connector engaging means thereon and movably mounted on supporting structure extending above a circuit board support means;

power means for moving said connector mounting means through a predetermined path towards and away from said support means;

releasable retaining means supported by said supporting structure for releasably retaining a connector in said path until engaged by said connector engagement means as said connector mounting means moves towards said support means; and parallel side walls attached to said supporting structure and extending rearwardly from each side of said path and having inwardly projecting rails on which connectors may be supported and moved towards said path.

2. The connector mounting press of claim 1 further including connector-carrying magazine means removably received in between said side walls for advancing connectors therein onto said rails.

3. The connector mounting press of claim 2 further including connector feed means for advancing connectors in said magazine means and on said rails into said path.

4. The connector mounting press of claim 3 wherein said connector feed means include a bar positionable behind the last connector in a row of connectors in said magazine means and/or on said rails and pressure means for urging said bar towards said path.

5. The connector mounting press of claim 4 wherein said side walls include tracks on the facing surfaces for slidably receiving and guiding said bar.

6. The connector mounting press of claim 5 wherein said pressure means include a pair of hanging weights, each located on line with and on each side of said path and connected to an end of said bar by cord means.

7. The connector mounting press of claim 1 wherein said releasable retaining means include spring loaded detents positioned on opposing sides of said path and retractably deposed in blocks attached to said supporting structure.

8. The connector mounting press of claim 1 wherein said connector mounting means includes an insertion head comprising push pins depending from a rectangular plate, one or more locator blocks slidably mounted on said push pins, sliding members slidingly attached to the vertical sides of said plate and commonly secured to said one or more locator blocks and coil springs with one end attached to a respective sliding member and another end attached to said supporting structure to bias said sliding members and attached locator blocks towards the distal ends of said push pins.

9. The connector mounting press of claim 1 further including an elongated rack for moving a circuit board across said path, said rack having lock receiving means thereon in a pattern corresponding to predetermined connector mounting locations on said circuit board and further including lock means cooperating with said lock receiving means on said rack for releasably locking said rack against further movement at each of said predetermined connector mounting locations.

10. The connector mounting press of claim 9 further including driving means for moving said rack.

11. The connector mounting press of claim 10 further including first switch means operable to interrupt said driving means each time said lock receiving means receives said lock means.

12. The connector mounting press of claim 11 further including second switch means operable to release said lock means from said lock receiving means after said connector mounting means mounts a connector on said circuit board.

13. A press for mounting components onto a circuit board, comprising:

support means for supporting a circuit board on which components are to be mounted;

supporting structure extending above said support means;

an insertion tool movably mounted on said supporting structure and having a plurality of push pins depending from push pin holding means with said push pins having distal ends spaced from said pin holding means and one or more locator blocks slidably mounted on said push pins;

power means for moving said insertion tool through a vertical path towards and away from said support means;

detents supported by said supporting means and retractably projecting into said path above said support means, said detents adapted to support a component in said path and to be retracted therefrom as said component is engaged by said locator blocks on said insertion tool; and sliding members slidingly attached to said push pin holding means and commonly secured to said one or more locator blocks and coil springs with one end attached to said sliding members and another end attached to said supporting structure so that when said insertion tool is positioned above said detents, said locator blocks are urged towards the distal ends of said push pins.

* * * * *